(12) United States Patent
Seth-Smith et al.

(10) Patent No.: US 6,972,803 B2
(45) Date of Patent: Dec. 6, 2005

(54) VIDEO SIGNAL FORMAT DETECTOR AND GENERATOR SYSTEM AND METHOD

(75) Inventors: Nigel James Seth-Smith, Lymington (GB); Dwayne G. Johnson, Flamborough (CA); John Hudson, Burlington (CA)

(73) Assignee: Gennum Corporation, (CA)

( * ) Notice: Subject to any disclaimer, the term of this patent is extended or adjusted under 35 U.S.C. 154(b) by 0 days.

(21) Appl. No.: 10/939,095

(22) Filed: Sep. 10, 2004

(65) Prior Publication Data

US 2005/0052577 A1    Mar. 10, 2005

Related U.S. Application Data

(60) Provisional application No. 60/502,036, filed on Sep. 10, 2003, provisional application No. 60/501,792, filed on Sep. 10, 2003, provisional application No. 60/502,028, filed on Sep. 11, 2003, provisional application No. 60/502,128, filed on Sep. 11, 2003.

(51) Int. Cl.[7] .............................................. H04N 5/46
(52) U.S. Cl. ...................... 348/558; 348/555; 348/521; 348/525; 348/516; 348/500
(58) Field of Search ................................ 348/558, 555, 348/556, 554, 553, 469, 500, 512, 510, 521, 348/525, 526, 537, 542, 540, 547, 497, 516, 348/425.4; 375/354, 355, 356, 362, 368

(56) References Cited

U.S. PATENT DOCUMENTS

| | | | |
|---|---|---|---|
| 3,819,859 A | 6/1974 | Borsuk et al. | |
| 4,097,896 A | 6/1978 | Avery | |
| 4,233,629 A | 11/1980 | Dayton | |
| 4,402,011 A | 8/1983 | Newton | |
| 4,675,722 A | 6/1987 | Hackett | |
| 4,680,633 A | 7/1987 | Gerdes et al. | |
| 4,860,098 A | 8/1989 | Murphy | |
| 4,882,624 A | 11/1989 | Sumiyoshi | |
| 5,111,160 A | 5/1992 | Hershberger | |
| 5,134,481 A | 7/1992 | Gornati | |
| 5,260,790 A | 11/1993 | Takayama | |
| 5,432,559 A | 7/1995 | Bruins et al. | |
| 5,486,869 A | 1/1996 | Cooper | |

(Continued)

FOREIGN PATENT DOCUMENTS

EP    0808062 B1    10/2002

(Continued)

OTHER PUBLICATIONS

Yu, Joseph, "Input Clock Generator (ICG 7051-1)—Preliminary Circuit Description and Test Procedures", Sep. 1977, pp. 23-26 with 42 pages of diagrams/drawings.

(Continued)

Primary Examiner—John Miller
Assistant Examiner—Jean W. Désir
(74) Attorney, Agent, or Firm—Jones Day

(57) ABSTRACT

A video processing system and method are provided for generating clock and timing signals from an incoming video signal. The system includes a timing reference circuit for generating a reference clock signal, a video format detector coupled to the reference clock signal and to synchronization data derived from the incoming video signal for generating a format signal indicating the format of the incoming video signal, and a clock and timing generator circuit coupled to the format signal and the reference clock signal for generating clock and timing signals that emulate the incoming video signal, and may be locked to the incoming video signal.

18 Claims, 12 Drawing Sheets

U.S. PATENT DOCUMENTS

| | | | |
|---|---|---|---|
| 5,614,956 A * | 3/1997 | Matsuura | 348/556 |
| 5,754,250 A | 5/1998 | Cooper | |
| 5,767,917 A | 6/1998 | Gornstein | |
| 5,796,442 A * | 8/1998 | Gove et al. | 348/556 |
| 5,872,601 A | 2/1999 | Seitz | |
| 5,953,069 A | 9/1999 | Bruins et al. | |
| 6,057,889 A * | 5/2000 | Reitmeier et al. | 348/555 |
| 6,108,046 A * | 8/2000 | Wu et al. | 348/558 |
| 6,130,721 A * | 10/2000 | Yoo et al. | 348/558 |
| 6,154,256 A | 11/2000 | Bruins | |
| 6,337,716 B1 * | 1/2002 | Yim | 348/554 |
| 6,373,527 B1 * | 4/2002 | Lee | 348/564 |
| 6,384,867 B1 * | 5/2002 | Seino et al. | 348/558 |
| 6,476,872 B1 * | 11/2002 | Ilkawa et al. | 348/558 |
| 6,545,725 B1 * | 4/2003 | Fujita et al. | 348/604 |
| 6,603,516 B1 * | 8/2003 | Fujiwara et al. | 348/558 |
| 6,608,610 B2 * | 8/2003 | Nagai | 345/63 |

FOREIGN PATENT DOCUMENTS

| | | |
|---|---|---|
| JP | 3173273 | 7/1991 |

OTHER PUBLICATIONS

SCB-200N Schemicatic Diagram, Jun. 30, 1993, 6 diagrams.

Gennum Corporation, GS4882; GS4982 Video Sync Separators with 50% Sync Slicing Data Sheet, Jul. 2004, 7 pages.

Leitch, "DTG-1000N Digital Test Generator-Instruction Manual", pp. 1-15 with 29 pages diagrams/drawings.

The Grass Valley Group Inc., "Data Package, 9505 Color Black Sync Pulse Generator Module", Issue No. 1, 23 pages (includes drawings/diagrams).

The Grass Valley Group Inc., "SCB-200N Sync/Color Bar Generator" Manual No. TP7034-00-Issue No. 1, 9 pages.

"Input Sync Separator" ISS, BD4-A, 11 pages (includes drawings/diagrams).

National Semiconductor, LM1881, LM1881-X Video Sync Separator, Jun. 2003, pp. 1-12.

Intersil, Sync Separator, 50% Slice, S-H Filter, H out, Aug. 15, 2002, pp 1-9.

Intersil, Sync Separator, 50% Slice, S-H Filter, Aug. 16, 2002, pp 1-9.

Gennum Corporation, GS1881, GS4881, GS4981, Monolithic Video Sync Separators Data Sheet, Jul. 2004, pp. 1-14.

Leitch, DTG-1000N Digital Test Generator-Instruction Manual, 40 pages (includes drawings/diagrams).

Leitch 1000 GG Schematic 1981, 3 pages.

ICG Digital Video Systems 7051, 1979, 2 pages.

Digital Video Systems, DPS-1 Operators Manual, 555 pages.

Digital Video Systems Master Manual, Aug. 1976, 272 pages.

PCT International Search Report (PCT Article 18 and Rules 43 and 44)—4 pages.

* cited by examiner

| HORIZONTAL INPUT DATA | | | | | VERTICAL INPUT DATA | | OUTPUT |
|---|---|---|---|---|---|---|---|
| 27MHz CLOCKS/ LINE | NOMINAL | TOLERANCE +/− | 27MHz CLOCKS/ 16 LINES | TOLERANCE +/− | TOTAL LINES/ FIELD | TOTAL LINES/ 2 FIELDS | VIDEO/ GRAPHICS STANDARD |
| 254.12 | 254 | 3 | 4065.92 | | 1250 | 2500 | 53 |
| 283.2 | 283 | 3 | 4531.2 | | 1589 | 3178 | 54 |
| 288 | 288 | 3 | 4608 | | 1250 | 2500 | 52 |
| 296.3 | 296 | 3 | 4740.8 | | 1072 | 2144 | 50 |
| 337.71 | 338 | 3 | 5403.36 | | 1066 | 2132 | 49 |
| 360 | 360 | 4 | 5760 | | 1250 | 2500 | 51 |
| 393.13 | 393 | 4 | 6290.08 | | 808 | 1616 | 47 |
| 400 | 400 | SEE 16 LINE TOLERANCE | 6400 | 3 | 1125 | 2250 | 21 |
| 400.4 | 401 | SEE 16 LINE TOLERANCE | 6406.4 | 6407+/−3 | 1125 | 2250 | 22 |
| 422.14 | 422 | 4 | 6754.24 | | 1066 | 2132 | 48 |
| | | | | | | | |
| 450 | 450 | 5 | 7200 | | 800 | 1600 | 46 |
| 480 | 480 | 5 | 7680 | | 1125 | 2250 | 23 |
| 503.4 | 503 | 5 | 8054.4 | | 631 | 1262 | 44 |
| 558.3 | 558 | 6 | 8932.8 | | 806 | 1612 | 45 |
| 576 | 576 | 6 | 9216 | | 625 | 1250 | 43 |
| 600 | 600 | SEE 16 LINE TOLERANCE | 9600 | 3 | 750 | 1500 | 11 |
| 600.6 | 601 | SEE 16 LINE TOLERANCE | 9609.6 | 9610+/−3 | 750 | 1500 | 12 |
| 624.06 | 624 | 6 | 9984.96 | | 509 | 1018 | 41 |
| 716.56 | 716 | 7 | 11464.96 | | 628 | 1256 | 42 |
| 720 | 720 | 7 | 11520 | | 750 | 1500 | 13 |
| 720 | 720 | 7 | 11520 | | 500 | 1000 | 40 |
| 800 | 800 | SEE 16 LINE TOLERANCE | 12800 | 4 | 562.5 | 1125 | 19 |
| 800 | 800 | SEE 16 LINE TOLERANCE | 12800 | 4 | 562.5 | 1125 | 25 |
| 800 | 800 | SEE 16 LINE TOLERANCE | 12800 | 4 | 1125 | 2250 | 29 |
| 800 | 800 | SEE 16 LINE TOLERANCE | 12800 | 4 | 562.5 | 1125 | 30 |

SEE CONTINUATION FIG. 3B

Fig. 3A

CONTINUED FROM FIG. 3A

| | | | | | | | |
|---|---|---|---|---|---|---|---|
| 800.8 | 801 | SEE 16 LINE TOLERANCE | 12812.8 | 4 | 562.5 | 1125 | 20 |
| 800.8 | 801 | SEE 16 LINE TOLERANCE | 12812.8 | 4 | 562.5 | 1125 | 26 |
| 800.8 | 801 | SEE 16 LINE TOLERANCE | 12812.8 | 4 | 1125 | 2250 | 31 |
| 800.8 | 801 | SEE 16 LINE TOLERANCE | 12812.8 | 4 | 562.5 | 1125 | 32 |
| 857.14 | 857 | 8 | 13714.24 | | 525 | 1050 | 39 |
| 858 | 858 | 3 | 13728 | | 525 | 1050 | 9 |
| 864 | 864 | 3 | 13824 | | 625 | 1250 | 10 |
| | | | | | | | |
| 960 | 960 | 4 | 15360 | | 562.5 | 1125 | 27 |
| 960 | 960 | 4 | 15360 | | 1125 | 2250 | 33 |
| 960 | 960 | 4 | 15360 | | 562.5 | 1125 | 34 |
| 1000 | 1000 | SEE 16 LINE TOLERANCE | 16000 | 6 | 1125 | 2250 | 35 |
| 1000 | 1000 | SEE 16 LINE TOLERANCE | 16000 | 6 | 562.5 | 1125 | 36 |
| 1001 | 1001 | SEE 16 LINE TOLERANCE | 16016 | 6 | 1125 | 2250 | 37 |
| 1001 | 1001 | SEE 16 LINE TOLERANCE | 16016 | 6 | 562.5 | 1125 | 38 |
| 1200 | 1200 | SEE 16 LINE TOLERANCE | 19200 | 8 | 750 | 1500 | 14 |
| 1201.2 | 1201 | SEE 16 LINE TOLERANCE | 19219.2 | 8 | 750 | 1500 | 15 |
| 1440 | 1440 | 4 | 23040 | | 750 | 1500 | 16 |
| 1500 | 1500 | SEE 16 LINE TOLERANCE | 24000 | 8 | 750 | 1500 | 17 |
| 1501.5 | 1502 | SEE 16 LINE TOLERANCE | 24024 | 8 | 750 | 1500 | 18 |
| 1716 | 1716 | 32 | 27456 | | 262.5 | 525 | 1 |
| 1716 | 1716 | 32 | 27456 | | 262.5 | 525 | 3 |
| 1716 | 1716 | 32 | 27456 | | 262.5 | 525 | 5 |
| 1716 | 1716 | 32 | 27456 | | 262.5 | 525 | 7 |
| 1728 | 1728 | 32 | 27648 | | 312.5 | 625 | 2 |
| 1728 | 1728 | 32 | 27648 | | 312.5 | 625 | 4 |
| 1728 | 1728 | 32 | 27648 | | 312.5 | 625 | 6 |
| 1728 | 1728 | 32 | 27648 | | 312.5 | 625 | 8 |

SEE CONTINUATION FIG. 4B

| VID_ST 0[5:0] | SYSTEM NOMENCLATURE | VIDEO CLOCK FREQ. (MHz) | PCLOCKS/ TOTAL LINE | TOTAL LINES/ FRAME | H SYNC WIDTH CLOCKS | H SYNC POLARITY | H SYNC TO ACTIVE START CLOCKS | H SYNC TO ACTIVE END CLOCKS | V SYNC WIDTH LINES | V SYNC POLARITY | V SYNC TO END OF DIGITAL BLANKING | V SYNC TO ACTIVE START LINES | V SYNC TO ACTIVE END LINES | SAMPLES/ ACTIVE LINE | ACTIVE LINES/ FRAME |
|---|---|---|---|---|---|---|---|---|---|---|---|---|---|---|---|
| 0 | DISABLE | | | | | | | | | | | | | | |
| 1 | 4fsc 525/2:1 INTERLACE | 14.32 | 910 | 525 | 67 | – | 125 | 893 | 3 | – | 9 | 17 | 259.5 | 768 | 486 |
| 2 | COMPOSITE PAL** | | | 625 | | – | | | 2.5 | – | | 22.5 | 310 | | 576 |
| 3 | 601 525/2:1 INTERLACE | 27 | 1716 | 525 | 127 | – | 244 | 1684 | 3 | – | 9 | 17 | 259.5 | 720 | 486 |
| 4 | 601 625/2:1 INTERLACE | 27 | 1728 | 625 | 127 | – | 264 | 1704 | 2.5 | – | | 22.5 | 310 | 720 | 576 |
| 5 | 601-18MHz 525/2:1 INTERLACE | 36 | 2288 | 525 | 169 | – | 325 | 2245 | 3 | – | 9 | 17 | 259.5 | 960 | 486 |
| 6 | 601-18MHz 625/2:1 INTERLACE | 36 | 2304 | 625 | 169 | – | 352 | 2272 | 2.5 | – | | 22.5 | 310 | 960 | 576 |
| 7 | 720x486/59.94/2:1 INTERLACE | 54 | 858 | 525 | 126 | – | 244 | 1684 | 3 | – | 9 | 17 | 259.5 | 720 | 486 |
| 8 | 720x576/50/2:1 INTERLACE | 54 | 864 | 625 | 126 | – | 264 | 1704 | 2.5 | – | | 22.5 | 310 | 720 | 576 |

CONTINUED FROM FIG. 4A

| | | | | | | | | | | | |
|---|---|---|---|---|---|---|---|---|---|---|---|
| 9 | 720x483/59.94/1:1 PROGRESSIVE | 54 | 858 | 525 | 63 | — | 122 | 842 | 6 | — | | | 36 | 519 | 720 | 483 |
| 10 | 720x576/50/1:1 PROGRESSIVE | 54 | 864 | 625 | 63 | — | 132 | 852 | 5 | — | | | 44 | 620 | 720 | 576 |
| 11 | 1280x720/60/1:1 PROGRESSIVE | 74.25 | 1650 | 750 | 80 | tri | 260 | 1540 | 5 | — | | | 25 | 746 | 1280 | 720 |
| 12 | 1280x720/59.94/1:1 PROGRESSIVE | 74.175 | 1650 | 750 | 80 | tri | 260 | 1540 | 5 | — | | | 25 | 746 | 1280 | 720 |
| 13 | 1280/720/50/1:1 PROGRESSIVE | 74.25 | 1980 | 750 | 80 | tri | 260 | 1540 | 5 | — | | | 25 | 746 | 1280 | 720 |
| 14 | 1280/720/30/1:1 PROGRESSIVE | 74.25 | 3300 | 750 | 80 | tri | 260 | 1540 | 5 | — | | | 25 | 746 | 1280 | 720 |
| 15 | 1280x720/29.97/1:1 PROGRESSIVE | 74.175 | 3300 | 750 | 80 | tri | 260 | 1540 | 5 | — | | | 25 | 746 | 1280 | 720 |
| 16 | 1280x720/25/1:1 PROGRESSIVE | 74.25 | 3960 | 750 | 80 | tri | 260 | 1540 | 5 | — | | | 25 | 746 | 1280 | 720 |
| 17 | 1280x720/24/1:1 PROGRESSIVE | 74.25 | 4125 | 750 | 80 | tri | 260 | 1540 | 5 | — | | | 25 | 746 | 1280 | 720 |
| 18 | 1280x720/23.98/1:1 PROGRESSIVE | 74.175 | 4125 | 750 | 80 | tri | 260 | 1540 | 5 | — | | | 25 | 746 | 1280 | 720 |
| 19 | 1920x1035/60/2:1 INTERLACE | 74.25 | 2200 | 1125 | 80 | tri | 192 | 2112 | 5 | — | | | 40/39.5* | 557/557.5* | 1920 | 1035 |
| 20 | 1920x1035/59.94/2:1 INTERLACE | 74.175 | 2200 | 1125 | 80 | tri | 192 | 2112 | 5 | — | | | 40/39.5* | 557/557.5* | 1920 | 1035 |

SEE CONTINUATION FIG. 4C

Fig. 4B

CONTINUED FROM FIG. 4B

| | | | | | | | | | | | | |
|---|---|---|---|---|---|---|---|---|---|---|---|---|
| 21 | 1920x1808/60/1:1 PROGRESSIVE | 148.5 | 2200 | 1125 | 80 | tri | 192 | 2112 | 5 | | | | |
| 22 | 1920x1080/59.94 /1:1 PROGRESSIVE | 148.35 | 2200 | 1125 | 80 | tri | 192 | 2112 | 5 | — | 41 | 1121 | 1920 | 1080 |
| 23 | 1920x1080/50/1:1 PROGRESSIVE | 148.5 | 2640 | 1125 | 80 | tri | 192 | 2112 | 5 | — | 41 | 1121 | 1920 | 1080 |
| 25 | 1920x1080/60/2:1 INTERLACE | 74.25 | 2200 | 1125 | 80 | tri | 192 | 2112 | 5 | — | 41 | 1121 | 1920 | 1080 |
| 26 | 1920x1080/59.94 /2:1 INTERLACE | 74.175 | 2200 | 1125 | 80 | tri | 192 | 2112 | 5 | — | 20/20.5* | 560/560.5* | 1920 | 1080 |
| 27 | 1920x1080/50/2:1 INTERLACE | 74.25 | 2640 | 1125 | 80 | tri | 192 | 2112 | 5 | — | 20/20.5* | 560/560.5* | 1920 | 1080 |
| 29 | 1920x1080/30/1:1 PROGRESSIVE | 74.25 | 2200 | 1125 | 80 | tri | 192 | 2112 | 5 | — | 20/20.5* | 560/560.5* | 1920 | 1080 |
| 30 | 1920x1080/30/PsF | 74.25 | 2200 | 1125 | 80 | tri | 192 | 2112 | 5 | — | 41 | 1121 | 1920 | 1080 |
| 31 | 1920x1080/29.97 /1:1 PROGRESSIVE | 74.175 | 2200 | 1125 | 80 | tri | 192 | 2112 | 5 | — | 20/20.5* | 560/560.5* | 1920 | 1080 |
| 32 | 1920x1080/29.97 -/PsF | 74.175 | 2200 | 1125 | 80 | tri | 192 | 2112 | 5 | — | 41 | 1121 | 1920 | 1080 |
| 33 | 1920x1080/25/1:1 PROGRESSIVE | 74.25 | 2640 | 1125 | 80 | tri | 192 | 2112 | 5 | — | 20/20.5* | 560/560.5* | 1920 | 1080 |

SEE CONTINUATION FIG. 4D

*Fig. 4C*

CONTINUED FROM FIG. 4C

| | | | | | | | | | | | | | | | |
|---|---|---|---|---|---|---|---|---|---|---|---|---|---|---|---|
| 34 | 1920x1080/25/PsF | 74.25 | 2640 | 1125 | 80 | tri | | 192 | 2112 | 5 | | 20/20.5* | 560/560.5* | 1920 | 1080 |
| 35 | 1920x1080/24/1:1 PROGRESSIVE | 74.25 | 2750 | 1125 | 80 | tri | | 192 | 2112 | 5 | − | 41 | 1121 | 1920 | 1080 |
| 36 | 1920x1080/24/PsF | 74.25 | 2750 | 1125 | 80 | tri | | 192 | 2112 | 5 | | 20/20.5* | 560/560.5* | 1920 | 1080 |
| 37 | 1920x1080/23.98/1:1 PROGRESSIVE | 74.175 | 2750 | 1125 | 80 | tri | | 192 | 2112 | 5 | − | 41 | 1121 | 1920 | 1080 |
| 38 | 1920x1080/23.98/PsF | 74.175 | 2750 | 1125 | 80 | tri | | 192 | 2112 | 5 | | 20/20.5* | 560/560.5* | 1920 | 1080 |
| 39 | 640 x 480 VGA @ 60Hz | 25.2 | 800 | 525 | 96 | − | | 144 | 784 | 2 | − | 35 | 515 | 640 | 480 |
| 40 | 640 x 480 VGA @ 75Hz | 31.5 | 840 | 500 | 64 | − | | 184 | 824 | 3 | − | 19 | 499 | 640 | 480 |
| 41 | 640 x 480 VGA @ 85Hz | 36 | 832 | 509 | 56 | − | | 136 | 776 | 3 | − | 28 | 508 | 640 | 480 |
| 42 | 800 x 600 SVGA @ 60Hz | 40.00 | 1056 | 628 | 128 | + | | 216 | 1016 | 4 | + | 27 | 627 | 800 | 600 |
| 43 | 800 x 600 @ 75Hz SVGA | 49.5 | 1056 | 625 | 80 | + | | 240 | 1040 | 3 | + | 24 | 624 | 800 | 600 |
| 44 | 800 x 600 SVGA @ 85Hz | 56.25 | 1048 | 631 | 64 | + | | 216 | 1015 | 3 | + | 30 | 630 | 800 | 600 |
| 45 | 1024 x 768 XGA @ 60Hz | 65 | 1344 | 806 | 136 | − | | 296 | 1320 | 6 | − | 35 | 803 | 1024 | 768 |

SEE CONTINUATION FIG. 4E

*Fig. 4D*

CONTINUED FROM FIG. 4D

| | | | | | | | | | | | | | |
|---|---|---|---|---|---|---|---|---|---|---|---|---|---|
| 46 | 1024 x 768 XGA @ 75Hz | 78.75 | 1312 | 800 | 96 | + | 272 | 1296 | 3 | | | | |
| 47 | 1024 x 768 XGA @ 85Hz | 94.5 | 1376 | 808 | 96 | + | 304 | 1328 | 3 | + | 31 | 799 | 1024 | 768 |
| 48 | 1280 x 1024 SXGA @ 60Hz | 108.00 | 1688 | 1066 | 112 | + | 360 | 1640 | 3 | + | 39 | 807 | 1024 | 768 |
| 49 | 1280 x 1024 SXGA @ 75Hz | 135.00 | 1688 | 1066 | 144 | + | 392 | 1672 | 3 | + | 41 | 1065 | 1280 | 1024 |
| 50 | 1280 x 1024 SXGA @ 85Hz | 157.5 | 1728 | 1072 | 160 | + | 384 | 1664 | 3 | + | 41 | 1065 | 1280 | 1024 |
| 51 | 1600 x 1200 UXGA @ 60Hz | 162 | 2160 | 1250 | 192 | + | 496 | 2096 | 3 | + | 47 | 1071 | 1280 | 1024 |
| 52 | 1600 x 1200 UXGA @ 75Hz | 101.25 | 1080 | 1250 | 96 | + | 248 | 2096 | 3 | + | 49 | 1249 | 1600 | 1200 |
| 53 | 1600 x 1200 UXGA @ 85Hz | 114.75 | 1080 | 1250 | 96 | + | 248 | 2096 | 3 | + | 49 | 1249 | 800 | 1200 |
| 54 | 2048 x 1536 QXGA @ 60Hz | 133.476 | 1400 | 1589 | 112 | - | 300 | 1324 | 3 | + | 52 | 1588 | 1024 | 1536 |

| VIDEO/ GRAPHICS STANDARD | SYSTEM NOMENCLATURE | VIDEO/ CLOCK (MHz) | CLOCKS/ TOTAL LINE | TOTAL LINES/ FRAME | CLOCKS/ ACTIVE LINE | ACTIVE LINES/ FRAME | SCAN FORMAT STANDARD |
|---|---|---|---|---|---|---|---|
| 0 | DISABLE | | | | | | |
| 1 | 4fsc 525/2:1 INTERLACE | 14.32 | 910 | 525 | 768 | 486 | 244M |
| 2 | COMPOSITE PAL 625/2:1/25* | | | | | 576 | |
| 3 | 601 525/2:1 INTERLACE | 27 | 1716 | 525 | 1440 | 486 | 125M/267M |
| 4 | 601 625/2:1 INTERLACE | 27 | 1728 | 625 | 1440 | 576 | ITU-R BT.601/5 |
| 5 | 601-18MHz 525/2:1 INTERLACE | 36 | 2288 | 525 | 1920 | 486 | 267M |
| 6 | 601-18MHz 625/2:1 INTERLACE | 36 | 2304 | 625 | 1920 | 576 | ITU-R BT.601-5 |
| 7 | 720x486/59.94/2:1 INTERLACE | 54 | 3432 | 525 | 2880 | 486 | RP 174/347M |
| 8 | 720x576/50/2:1 INTERLACE | 54 | 3456 | 625 | 2880 | 576 | ITU-R BT.799/347M |
| 9 | 720x483/59.94/1:1 PROGRESSIVE | 54 | 1716 | 525 | 1440 | 483 | 293M/347M |
| 10 | 720x576/50/1:1 PROGRESSIVE | 54 | 1728 | 625 | 1440 | 576 | ITU-R BT.1358/347M |
| 11 | 1280x720/60/1:1 PROGRESSIVE | 74.25 | 1650 | 750 | 1280 | 720 | 296M |
| 12 | 1280x720/59.94/1:1 PROGRESSIVE | 74.175 | 1650 | 750 | 1280 | 720 | 296M |
| 13 | 1280x720/50/1:1 PROGRESSIVE | 74.25 | 1980 | 750 | 1280 | 720 | 296M |
| 14 | 1280x720/30/1:1 PROGRESSIVE | 74.25 | 3300 | 750 | 1280 | 720 | 296M |
| 15 | 1280x720/29.97/1:1 PROGRESSIVE | 74.175 | 3300 | 750 | 1280 | 720 | 296M |
| 16 | 1280x720/25/1:1 PROGRESSIVE | 74.25 | 3960 | 750 | 1280 | 720 | 296M |
| 17 | 1280x720/24/1:1 PROGRESSIVE | 74.25 | 4125 | 750 | 1280 | 720 | 296M |

SEE CONTINUATION FIG. 5B

CONTINUED FROM FIG. 5A

| | | | | | | |
|---|---|---|---|---|---|---|
| 18 | 1280x720/23.98/1:1 PROGRESSIVE | 74.175 | 4125 | 750 | 1280 | 720 | 296M |
| 19 | 1920x1035/60/2:1 INTERLACE | 74.25 | 2200 | 1125 | 1920 | 1035 | 260M |
| 20 | 1920x1035/59.94/2:1 INTERLACE | 74.175 | 2200 | 1125 | 1920 | 1035 | 260M |
| 21 | 1920x1080/60/1:1 PROGRESSIVE | 148.5 | 2200 | 1125 | 1920 | 1080 | 274M |
| 22 | 1920x1080/59.94/1:1 PROGRESSIVE | 148.35 | 2200 | 1125 | 1920 | 1080 | 274M |
| 23 | 1920x1080/50/1:1 PROGRESSIVE | 148.5 | 2640 | 1125 | 1920 | 1080 | 274M |
| 24 | NOT USED | | | | | | |
| 25 | 1920x1080/60/2:1 INTERLACE | 74.25 | 2200 | 1125 | 1920 | 1080 | 274M |
| 26 | 1920x1080/59.94/2:1 INTERLACE | 74.175 | 2200 | 1125 | 1920 | 1080 | 274M |
| 27 | 1920x1080/50/2:1 INTERLACE | 74.25 | 2640 | 1125 | 1920 | 1080 | 274M |
| 28 | NOT USED | | | | | | |
| 29 | 1920x1080/30/1:1 PROGRESSIVE | 74.25 | 2200 | 1125 | 1920 | 1080 | 274M |
| 30 | 1920x1080/30/PsF | 74.25 | 2200 | 1125 | 1920 | 1080 | RP211 |
| 31 | 1920x1080/29.97/1:1 PROGRESSIVE | 74.175 | 2200 | 1125 | 1920 | 1080 | 274M |
| 32 | 1920x1080/29.97/PsF | 74.175 | 2200 | 1125 | 1920 | 1080 | RP211 |
| 33 | 1920x1080/25/1:1 PROGRESSIVE | 74.25 | 2640 | 1125 | 1920 | 1080 | 274M |
| 34 | 1920x1080/25/PsF | 74.25 | 2640 | 1125 | 1920 | 1080 | RP211 |
| 35 | 1920x1080/24/1:1 PROGRESSIVE | 74.25 | 2750 | 1125 | 1920 | 1080 | 274M |
| 36 | 1920x1080/24/PsF | 74.25 | 2750 | 1125 | 1920 | 1080 | RP211 |
| 37 | 1920x1080/23.98/1:1 PROGRESSIVE | 74.175 | 2750 | 1125 | 1920 | 1080 | 274M |
| 38 | 1920x1080/23.98PsF | 74.175 | 2750 | 1125 | 1920 | 1080 | RP211 |

SEE CONTINUATION FIG. 5C

*Fig. 5B*

CONTINUED FROM FIG. 5B

| | | | | | | |
|---|---|---|---|---|---|---|
| 39 | 640x480 VGA @ 60Hz | 25.2 | 800 | 525 | 640 | 480 | IBM STANDARD |
| 40 | 640x480 VGA @ 75Hz | 31.5 | 840 | 500 | 640 | 480 | VESA VDMT75HZ |
| 41 | 640x480 VGA @ 85Hz | 36 | 832 | 509 | 640 | 480 | VESA VDMTPROP |
| 42 | 800x600 SVGA @ 60Hz | 39.79 | 1056 | 628 | 800 | 600 | VESA VG900602 |
| 43 | 800x600 @ 75Hz SVGA | 49.5 | 1056 | 625 | 800 | 600 | VESA VDMT75HZ |
| 44 | 800x600 SVGA @ 85Hz | 56.2 | 1048 | 631 | 800 | 600 | VESA VDMTPROP |
| 45 | 1024x768 XGA @ 60Hz | 65 | 1344 | 806 | 1024 | 768 | VESA VG901101A |
| 46 | 1024x768 XGA @ 75Hz | 78.72 | 1312 | 800 | 1024 | 768 | VESA VDMT75HZ |
| 47 | 1024x768 XGA @ 85Hz | 94.5 | 1376 | 808 | 1024 | 768 | VESA VDMTPROP |
| 48 | 1280x1024 SXGA @ 60Hz | 107.96 | 1688 | 1066 | 1280 | 1024 | VESA VDMTREV |
| 49 | 1280x1024 SXGA @ 75Hz | 134.95 | 1688 | 1066 | 1280 | 1024 | VESA VDMT75HZ |
| 50 | 1280x1024 SXGA @ 85Hz | 157.45 | 1728 | 1072 | 1280 | 1024 | VESA VDMTPROP |
| 51 | 1600x1200 UXGA @ 60Hz | 162 | 2160 | 1250 | 1600 | 1200 | VESA VDMTPROP |
| 52 | 1600x1200 UXGA @ 75Hz | 202.5*** | 2160 | 1250 | 1600 | 1200 | VESA VDMTPROP |
| 53 | 1600x1200 UXGA @ 85Hz | 229.5*** | 2160 | 1250 | 1600 | 1200 | VESA VDMTPROP |
| 54 | 2048x1536 QXGA @ 60Hz | 266.95?*** | 2800 | 1589 | 2048 | 1536 | VESA GENERALIZED TIMING FORMULA |

Fig. 5C

VIDEO SIGNAL FORMAT DETECTOR AND GENERATOR SYSTEM AND METHOD

CROSS-REFERENCE TO RELATED APPLICATION

This application claims the benefit of U.S. Provisional Application Ser. Nos. 60/502,036, entitled "Digital Windowing For Video Sync Separation," filed on Sep. 10, 2003; 60/501,792, entitled "Composite Color Frame Identifier System And Method," filed on Sep. 10, 2003; 60/502,028, entitled "Video Signal Sync Separator System And Method"; and 60/502,128, entitled "Video Signal Format Detector And Generator System And Method," filed on Sep. 11, 2003. The entire disclosures of Application Ser. Nos. 60/502,036, 60/501,792, 60/502,028, 60/502,128 are incorporated herein by reference.

This application is related to co-pending U.S. Non-provisional Applications Ser. Nos. 10/935,874, entitled "Digital Windowing for Video Sync Separation," filed on Sep. 8, 2003, and 10/935,875, entitled "Composite Color Frame Identifier System And Method," also filed on Sep. 8, 2003, the entire disclosures of which are incorporated herein by reference.

BACKGROUND

1. Technical Field

This application generally relates to video signal processing systems and methods.

2. Description of the Related Art

As video and graphics signal formats proliferate, it becomes increasingly necessary for processing and display equipment to be multi-format. This equipment typically includes digital processing circuitry that requires a precise timing reference, or system clock, which is faster than any of the timing information (e.g., synchronizing pulses) contained in the input video or graphics signal(s). Typically, the frequency of this system clock is a multiple of the synchronizing pulses contained in the input video or graphics signal(s). It is desirable that this system clock have a short term frequency precision better than that of the input signal (i.e., it should have low jitter).

SUMMARY

A video processing system and method are provided for generating clock and timing signals from an incoming video signal. The system includes a timing reference circuit for generating a reference clock signal, a video format detector coupled to the reference clock signal and to synchronization data derived from the incoming video signal for generating a format signal indicating the format of the incoming video signal, and a clock and timing generator circuit coupled to the format signal and the reference clock signal for generating output clock and timing signals that emulate the incoming video signal. The outgoing format can be configured, either manually or automatically, to be the same as the incoming format, and optionally to be locked in frequency and in phase to the input format. It can alternatively be specified to be a different outgoing format than the incoming format, which may also optionally be locked to the incoming format. This allows the concept of "cross-locking" where the clock and timing signals that are being generated in one format are locked to a different input format.

BRIEF DESCRIPTION OF THE DRAWINGS

FIG. 3 is an exemplary table of standard formats and corresponding timing measurements and tolerances;

FIG. 4 is an exemplary table of clock and timing signals; and

FIG. 5 is an exemplary table of standard format video and graphics signals and corresponding timing characteristics.

DETAILED DESCRIPTION

Figure 1:
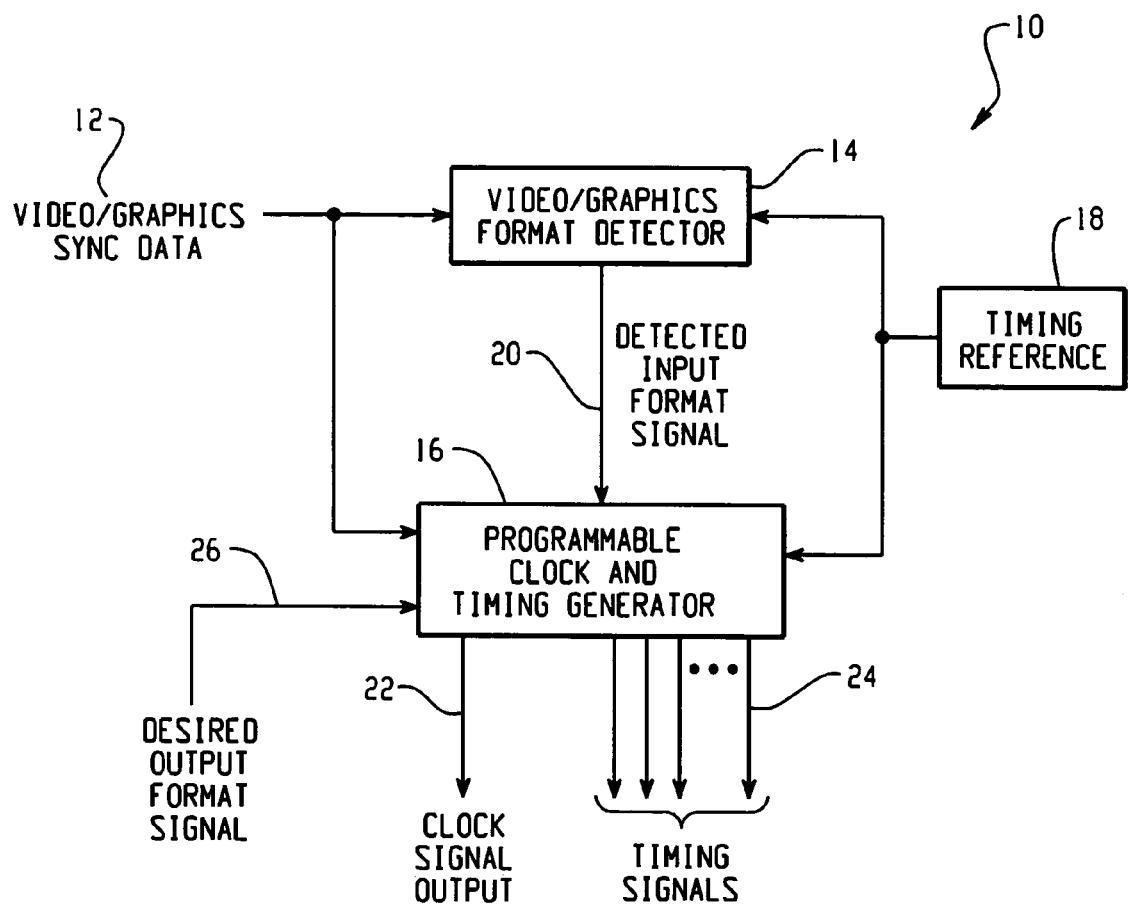
FIG. 1 is a general block diagram of an exemplary video format detector and generator.

FIG. 1 is a general block diagram of an exemplary video format detector and generator 10, including a video/graphics format detector 14, a timing reference 18, and a programmable clock and timing generator 16. Synchronization data from a video signal 12, such as a composite video signal, or some other form of video and/or graphics signal, is provided as an input to the video/graphics format detector 14. This synchronization data 12 may be, for example, horizontal and/or vertical synchronization pulses representing the horizontal and vertical timing references of a video or graphics signal.

The video/graphics format detector 14 receives the synchronization data 12 and also receives a reference signal from a timing reference 18. The timing reference may be, for example, a precision oscillator that generates a precise reference signal. Using this timing reference signal as a baseline measurement tool, the video/graphics format detector 14 processes the input synchronization data to determine the incoming format of the video and/or graphics signal associated with the synchronization data 12. Having determined the incoming format of the video signal, the video/graphics format detector 14 outputs a signal 20 indicative of the detected input format.

The video/graphics format detector 14 outputs the detected input format signal 20 to the programmable clock and timing generator 16. Also provided as an input to this block 16 is the reference signal from the timing reference circuit 18, the sync data 12, and the desired output format signal 26. Preferably, the reference signal from the timing reference circuit 18 is the same reference signal that is provided to the video/graphics format detector 14, but in alternative implementations it could be a different reference signal. The programmable clock and timing generator 16 uses its input signals to generate an output clock signal output 22, which serves as the system clock for any circuitry coupled to the circuit 10, and also generates a plurality of output timing signals 24. In cases where the output signals are to be locked to the input, the detected input format signal 20 is used to indicate the required relationship between the input and output formats.

The generated output clock signal 22 and timing signals 24 are precisely generated by the system of FIG. 1 such that the signals have low-jitter and low noise. This feature is beneficial even for the mode where the desired output format is configured to be the same as the detected input format 20. Additional circuitry, components and systems may then utilize these generated clock and timing signals to perform additional precision video processing.

Figure 2:
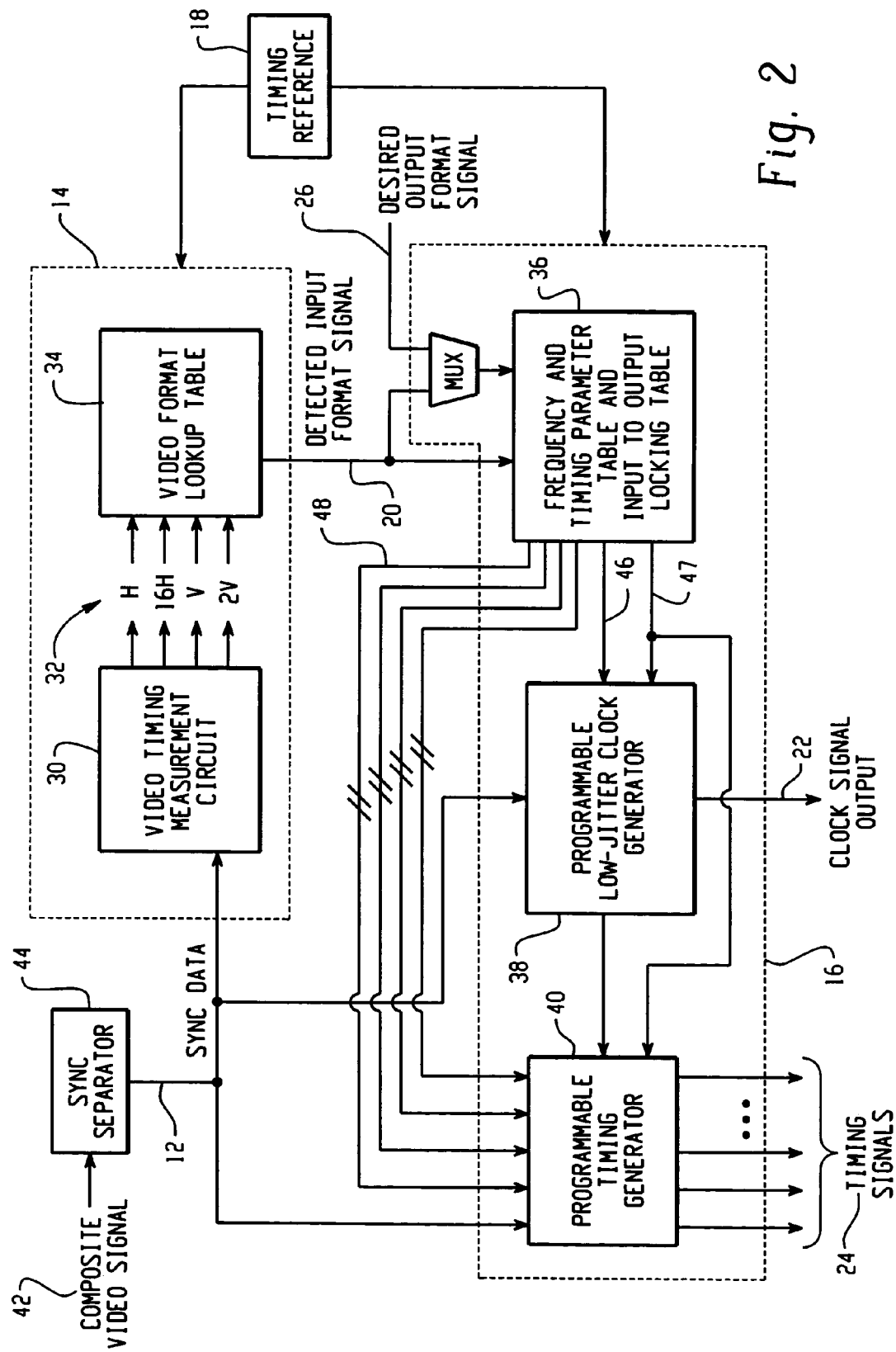
FIG. 2 is a more specific block diagram of the exemplary video format detector and generator of FIG. 1.

FIG. 2 is a more specific block diagram of the exemplary video format detector and generator of FIG. 1. A composite video signal 42, for example, is provided to a video sync separator 44, which extracts sync data 12 from the composite signal. This sync data could be, for example, both horizontal and video synchronization pulses from the composite sync signal 42. Other types of sync data, and other forms of video and/or graphic signals could also be utilized. The sync data 12 is provided to the video/graphics format detector 14, which includes a video timing measurement circuit 30 and a video format lookup table 34.

A fixed timing reference 18, such as a 27 MHz crystal oscillator, for example, is provided to the video/graphics format detector 14, and is used by this circuitry to measure the timing characteristics of the incoming video or graphics signal. The measurement(s) may be performed by the video timing measurement circuit 30 using, in one embodiment, a counter that measures the number of 27 MHz cycles between timing events in the incoming video signal. The timing events may be provided by synchronization signals 12, and the measurements may correspond to the periodicity, frequency, or some other characteristic of the Horizontal and/or vertical synchronizing pulses. Three additional counters may also be included in the video timing measurement circuit 30 for making additional measurements on the incoming video signal. For example, one additional counter may be configured to measure the number of Horizontal synchronizing pulses between adjacent Vertical synchronizing pulses. A second additional counter may be used to differentiate between interlaced and non-interlaced (progressive) signals, and also to count the number of Horizontal synchronizing pulses between three adjacent Vertical synchronizing pulses (i.e., over a period of two vertical intervals.) And a third additional counter may be used to determine the Horizontal timing period.

The third additional counter may possess enough precision to differentiate between pairs of broadcast video standards that differ by approximately one part in one thousand. In the described embodiment the counter counts the number of 27 MHz clock pulses over a period of 16 Horizontal intervals in the incoming signal. As there are approximately 6,000 clock cycles in 16 lines of the format pair with the highest horizontal frequency for the standards supported by this embodiment, 16 lines is sufficient for a 27 MHz reference. If a different timing reference is used, then a different measurement period may be necessary to realize the required precision.

Although in this embodiment a plurality of counters are used to make the measurements, in other embodiments different circuitry can be used to make the measurements 32 utilized to index the table 34. In addition, although this embodiment utilizes one counter for each of the measurements 32, in other embodiments a smaller or larger number of counters (or other types of measurement circuits) may be utilized.

FIG. 2 shows four video parameters 32 being measured by the video timing measurement circuit, these four video parameters 32 being labeled "H", "16H", "V", and "2V." The "H" parameter indicates the number of 27 MHz timing reference clocks within one horizontal sync period. The "16H" parameter represents the number of reference clocks within 16 horizontal sync periods. The "V" parameter represents the number of 27 MHz timing reference clocks within one vertical sync period, and the "2V" parameter represents the number of reference clocks within 2 vertical sync periods. These four measured parameters, in this embodiment, provide information regarding the periodicity of the incoming video signal, both from a horizontal and a vertical perspective. Other characteristics of the incoming video signal could alternatively be used as index values for the video format lookup table 34.

These measured video parameters are provided to a video format lookup table 34, which forms part of the video/graphics format detector 14. This table 34 is used to determine the format of the incoming video signal by comparing the four measured video parameters 32 with a set of stored video parameters in the table 34 that correspond to the measured parameters 32.

FIG. 3 is an exemplary table 34 of standard formats and corresponding timing measurements and tolerances associated with the four measured video parameters 32 shown in FIG. 2. Horizontal input data, such as the parameters "H" and "16H" are shown in the first five columns 34A of the table. Vertical input data, such as the parameters "V" and "2V" are shown in the next two columns 34B of the table. The table 34 also includes maximum differences (or tolerances) allowable for each measured parameter for each format The system of FIG. 2 compares the measured parameters 32 with the information stored in the video format lookup table 34 and outputs a format signal 20 indicative of the format of the incoming video signal 42. If the measured parameters 32 do not correspond to any of the table entries (taking into account the applicable tolerance measurements), then the system outputs a signal 20 indicating that the format is unrecognized.

The detected input format signal 20 is provided to the programmable clock and timing generator 16, which includes a multiplexer to determine if the desired output format signal 26 should be supplied externally or should be the same format as the detected input format, a frequency and timing parameter table (which may also serve as an input-to-output locking table) 36, a programmable low-jitter clock generator 38, and a programmable timing generator 40. Also provided as an input to the programmable clock and timing generator circuit 16 is the 27 MHz reference signal from the timing reference 18.

The frequency and timing parameter table 36 is used to associate each of the pre-defined video output formats with a set of frequency and timing parameters that are utilized to generate the output format from a high accuracy timing reference. FIG. 4 is an exemplary table of such clock and timing signals. The first column of this table 36 is the desired output format signal. Using this signal as an index, the remaining signals 46, 48 are provided by the table 36 for the defined format indicated in the second column 58. Signals 46, 48 include two types of signals, a first type 46, which is a frequency parameter signal, and a second type 48, which is a timing parameter signal. An additional (or modified) table which may be used for embodiments that provide locking of the output format to the input format may comprise a two-dimensional look-up table which defines the ratio of the outgoing clock frequency to the incoming sync signal frequency for the particular input/output format combination, and the ratio of the outgoing timing signals to the incoming sync signals. This information 47 is supplied to block 38 to allow the generated clock 32 to be locked in frequency and phase to the incoming sync data 12, and is also supplied to block 40 to allow the generated timing signals 24 to be locked to the incoming sync signals. The selected combinations of input and output formats for cross-locking should provide reasonable frequency ratios so that locking may be achieved within sensible time limits.

The frequency parameter signal 46 is provided to the programmable low-jitter clock generator 38, which uses this signal to generate the clock signal output 22 for the remaining circuitry attached to the system shown in FIG. 2. The timing parameter signals 48 are provided to the programmable timing generator 40, and are used by this circuit to generate the plurality of output timing signals 24.

Typical timing parameter signals 48 shown in FIG. 4 include clocks per total line, total lines per frame, H Sync width clocks, H Sync polarity, H Sync to active start clocks, H Sync to active end clocks, V Sync width lines, V Sync polarity, V Sync to end of digital blanking, V Sync to active start lines, V Sync to active end lines, samples per active line, and active lines per frame. Other parameters may also be provided by table 36. These signals 24 can be used to generate the various types of video/graphics formats indicated in FIGS. 3 and 4, and as further detailed in FIG. 5. FIG. 5 is an exemplary table of standard format video and graphics signals and corresponding timing characteristics.

The above-described embodiments of the invention are intended to be examples only. Those of skill in the art may effect alterations, modifications and variations to the particular embodiments without departing from the scope of the invention.

We claim:

1. A video processing circuit for generating clock and timing signals from an incoming video signal, comprising;
   a timing reference circuit for generating a reference clock signal;
   a video format detector coupled to the reference clock signal and to synchronization data derived from the incoming video signal for generating a format signal indicating the format of the incoming video signal; and
   a clock and timing generator circuit coupled to the format signal and the reference clock signal for generating clock and timing signals that emulate the incoming video signal;
   wherein the video format detector comprises:
   a video timing measurement circuit for receiving the synchronization data and the reference clock signal and for measuring one or more parameters of the synchronization data; and
   a video format lookup table storing video parameters regarding a plurality of video formats, each of the plurality of video formats being associated with one or more stored video parameters;
   wherein the video processing circuit compares the measured parameters from the video tinting measurement circuit with the stored video parameters in the video format lookup table in order to generate the format signal.

2. The video processing circuit of claim 1, wherein the video timing measurement circuit comprises at least one counter.

3. The video processing circuit of claim 2, wherein the counter measures the periodicity of the synchronization data.

4. The video processing circuit of claim 3, wherein the counter measures the periodicity of horizontal synchronization data.

5. The video processing circuit of claim 3, wherein the counter measures the periodicity of vertical synchronization data.

6. The video processing circuit of claim 1, wherein the synchronization data includes both horizontal and vertical synchronization data, and wherein the video timing measurement circuit includes at least two measurement circuits, a first measurement circuit for determining a first characteristic of the horizontal synchronization data and a second measurement circuit for determining a second characteristic of the vertical synchronization data.

7. The video processing circuit of claim 6, wherein the video timing measurement circuit includes two additional measurement circuits, a third circuit for determining a third characteristic of the horizontal synchronization data and a fourth circuit for determining a fourth characteristic of the vertical synchronization data.

8. The video processing circuit of claim 7, wherein the first, second, third and fourth measurement circuits are counters.

9. The video processing circuit of claim 1, wherein the video format lookup table associates one or more tolerance levels with at least some of the stored video parameters.

10. The video processing circuit of claim 9, wherein the one or more tolerance levels are applied to the stored video parameters when comparing the measured parameters to the data stored in the video format lookup table.

11. The video processing circuit of claim 10, wherein the format signal indicates an unrecognized format if the measured parameters from the video timing measurement circuit do not match up to the stored video parameters in the video format lookup table.

12. A video processing circuit for generating clock and timing signals from an incoming video signal, comprising:
   a timing reference circuit for generating a reference clock signal;
   a video format detector coupled to the reference clock signal and to synchronization data derived from the incoming video signal for generating a format signal indicating the format of the incoming video signal; and
   a clock and timing generator circuit coupled to the format signal and the reference clock signal for generating clock and timing signals that emulate the incoming video signal;
   wherein the clock and timing generator circuit comprises:
   a frequency and timing parameter table indexed by the format signal for generating frequency and timing parameters associated with the format indicated by the format signal;
   a clock generator for receiving the frequency parameter from the frequency and timing parameter table and for generating the clock signal emulating the incoming video signal; and
   a timing generator for receiving the timing parameter from the frequency and timing parameter table and for generating the timing signal emulating the incoming video signal.

13. The video processing circuit of claim 12, wherein the frequency and timing parameter table generates a plurality of timing parameters for each format, and wherein the timing generator receives the plurality of timing parameters and generates a plurality of timing signals emulating the incoming video signal.

14. A video processing method for generating clock and timing signals from an incoming video signal, comprising:
   generating a reference clock signal;
   deriving synchronization data from the incoming video signal;
   generating a format signal indicating the format of the incoming video signal based on the reference clock signals and the synchronization data by:
   storing video parameters regarding a plurality of video formats associated with one or more of the stored video parameters;

measuring one or more parameters of the synchronization data; and comparing the one or more measured parameters of the synchronization data to one or more stored video parameters to generate the format signal; and generating clock and timing signals that emulate the incoming video signal based on the format signal and the reference clock signal.

15. The method of claim 14, further comprising:

associating a tolerance level with at least some of the stored video parameters; and indicating an unrecognized video format in the video format signal if the one or more measured parameters do not match up with the one or more stored video parameters.

16. A video processing method for generating clock and timing signals from an incoming video signal, comprising:

generating a reference clock signal;

deriving synchronization data from the incoming video signal;

generating a format signal indicating the format of the incoming video signal based on the reference clock signals and the synchronization data; and generating clock and timing signals that emulate the incoming video signal based on the format signal and the reference clock signal by:

indexing a frequency and timing parameter table by the format signal to generate frequency and timing parameters associated with the format indicated by the format signal;

generating the clock signals that emulate the incoming video signal based on the indexed frequency parameter; and generating the timing signals that emulate the incoming video signal based on the indexed timing parameter.

17. A video processing apparatus for generating clock and timing signals from an incoming video signal, comprising:

means for generating a reference clock signal;

means for deriving synchronization data from the incoming video signal;

means for storing video parameters regarding a plurality of video formats associated with one or more of the stored video parameters;

means for measuring one or more parameters of the synchronization data;

means for comparing the one or more measured parameters of the synchronization data to one or more stored video parameters to generate the format signal; and means for generating clock and timing signals that emulate the incoming video signal based on the format signal and the reference clock signal.

18. A video processing apparatus for generating clock and timing signals from an incoming video signal, comprising:

means for generating a reference clock signal;

means for deriving synchronization data from the incoming video signal;

means for generating a format signal indicating the format of the incoming video signal based on the reference clock signals and the synchronization data;

means for generating frequency and timing parameters associated with the format indicated by the format signal;

means for generating the clock signals that emulate die incoming video signal bused on the indexed frequency parameter; and means for generating the timing signals that emulate the incoming video signal based on the indexed timing parameter.

* * * * *

UNITED STATES PATENT AND TRADEMARK OFFICE
CERTIFICATE OF CORRECTION

PATENT NO. : 6,972,803 B2
DATED : December 6, 2005
INVENTOR(S) : Seth Smith et al.

It is certified that error appears in the above-identified patent and that said Letters Patent is hereby corrected as shown below:

Column 5,
Line 44, change "tinting" to -- timing --.

Column 8,
Line 28, change "die" to -- the --.
Line 29, change "bused" to -- based --.

Signed and Sealed this

Eleventh Day of April, 2006

JON W. DUDAS
*Director of the United States Patent and Trademark Office*